United States Patent
Li et al.

(10) Patent No.: US 10,618,171 B2
(45) Date of Patent: Apr. 14, 2020

(54) MOBILE MANIPULATOR AND METHOD OF CONTROLLING THE MOBILE MANIPULATOR FOR TRACKING A SURFACE

(71) Applicant: AGENCY FOR SCIENCE, TECHNOLOGY AND RESEARCH, Singapore (SG)

(72) Inventors: Renjun Li, Singapore (SG); Boon Hwa Tan, Singapore (SG); Zhiyong Huang, Singapore (SG); Wei Yun Yau, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 142 days.

(21) Appl. No.: 15/547,478

(22) PCT Filed: Feb. 1, 2016

(86) PCT No.: PCT/SG2016/050050
§ 371 (c)(1),
(2) Date: Jul. 28, 2017

(87) PCT Pub. No.: WO2016/122416
PCT Pub. Date: Aug. 4, 2016

(65) Prior Publication Data
US 2018/0001479 A1    Jan. 4, 2018

(30) Foreign Application Priority Data
Jan. 30, 2015 (SG) .......................... 10201500773Y

(51) Int. Cl.
*B25J 9/16* (2006.01)
*B25J 5/00* (2006.01)
*B25J 13/08* (2006.01)

(52) U.S. Cl.
CPC ............. *B25J 9/1684* (2013.01); *B25J 5/007* (2013.01); *B25J 9/16* (2013.01); *B25J 13/089* (2013.01);
(Continued)

(58) Field of Classification Search
CPC ........ B25J 9/162; B25J 9/1697; B25J 9/1664; B25J 5/007; B25J 9/1684; G05D 2201/02; B23K 26/048
See application file for complete search history.

(56) References Cited

U.S. PATENT DOCUMENTS 4,675,502 A    6/1987  Haefner et al.
5,570,458 A    10/1996 Umeno et al.
(Continued)

FOREIGN PATENT DOCUMENTS

WO    WO-2019014707 A1 *  1/2019  ............. E04G 21/22

OTHER PUBLICATIONS

PCT International Search Report for PCT Counterpart Application No. PCT/SG2016/050050, 4 pgs (dated Apr. 4, 2016).
(Continued)

Primary Examiner — Dale Moyer
(74) Attorney, Agent, or Firm — Womble Bond Dickinson (US) LLP

(57) ABSTRACT

There is provided a method of controlling a mobile manipulator for tracking a surface. The mobile manipulator includes a mobile base movable in an axial direction of the mobile manipulator and a manipulator supported on the mobile base having an end effector adjustable in a lateral direction of the mobile manipulator. The method includes detecting the surface from the mobile manipulator, including positions of the surface at points along the surface, determining a reference path for the end effector to track based on an offset from the surface detected, determining a tracking error in the
(Continued)

reference path determined, and adjusting a position of the end effector in the lateral direction based on the tracking error to compensate for the tracking error in the reference path determined. There is also provided a corresponding mobile manipulator.

20 Claims, 6 Drawing Sheets

(52) U.S. Cl.
    CPC .............. *G05B 2219/36415* (2013.01); *G05B 2219/40298* (2013.01)

(56) References Cited

U.S. PATENT DOCUMENTS

| 6,563,130 | B2 | 5/2003 | Dworkowski et al. |
| 7,130,718 | B2 | 10/2006 | Gunnarsson et al. |
| 2008/0294288 | A1 | 11/2008 | Yamauchi |
| 2010/0234993 | A1* | 9/2010 | Seelinger ............... B25J 9/1697 700/254 |
| 2013/0330467 | A1* | 12/2013 | Bond ...................... E21D 11/10 427/8 |
| 2016/0016312 | A1* | 1/2016 | Lawrence, III ........ G01B 11/24 700/98 |

OTHER PUBLICATIONS

PCT Written Opinion for PCT Counterpart Application No. PCT/SG2016/050050, 4 pgs. (dated Apr. 4, 2016).

Mircea Nitulescu, "Mobile Robot Tracking Control Experiments along Memorized Planed Trajectories", 2006 IEEE International Conference on Automation, Quality and Testing, Robotics, vol. 2, pp. 296-301 (May 28, 2006).

M. Boukattaya, et al., "Robust adaptive control for mobile manipulators," International Journal of Automation and Computing, vol. 8, No. 1, pp. 8-13 (Feb. 18, 2011).

Jaewoong Kim, et al., "Structured Light camera base 3d visual perception and tracking application system with robot grasping task," 2013 IEEE International Symposium on Assembly and Manufacturing (ISAM), pp. 187-192 (Aug. 2, 2013).

\* cited by examiner

MOBILE MANIPULATOR AND METHOD OF CONTROLLING THE MOBILE MANIPULATOR FOR TRACKING A SURFACE

CROSS-REFERENCE TO RELATED APPLICATION

This patent application is a U.S. National Phase Application under 35 U.S.C. § 371 of international Application No. PCT/SG2016/050050, filed on 1 Feb. 2016, entitled MOBILE MANIPULATOR AND METHOD OF CONTROLLING THE MOBILE MANIPULATOR FOR TRACKING A SURFACE, which claims the benefit of priority of Singapore Patent Application No. 10201500773Y, filed on 30 Jan. 2015, the content of which was incorporated by reference in its entirety for all purposes.

TECHNICAL FIELD

The present invention generally relates to a mobile manipulator and a method of controlling the mobile manipulator for tracking/following a surface.

BACKGROUND

Mobile robot with manipulator systems are widely used in various fields for its mobility and portability. However, its position accuracy is not sufficiently high for delicate applications. Conversely, a robot arm has higher position accuracy and fast reaction speed but limited reachability or workspace.

An area of interest is that of surface tracking by a mobile robot/manipulator. For example, a mobile manipulator may need to follow a surface at a distance therebetween. Example applications include large structure inspection (e.g., welding and welding seam inspection), store checking (e.g., book scanning in a library) and painting in shipyards. These types of applications require the robot to maintain a close distance from the surface. Furthermore, servicing applications (e.g. table and window cleaning) and industrial applications (e.g., cutting and polishing) require contact between the surface and the end-effector of the mobile manipulator. Therefore, large tracking error would either result in losing contact with or excessive contact force being exerted on the surface.

There exist conventional methods such as Simultaneous Localization and Mapping (SLAM) for navigation. However, such conventional methods do not achieve a sufficient degree of accuracy in surface tracking in order to be suitable for various applications such as the applications as mentioned above. In such conventional methods, typically, the robot location is determined by comparing the sensor reading with the map, which has limited resolution. An accurate map with high resolution will result in large map files and slow down computation. This implies that with such conventional methods, the relative position between the mobile manipulator and the surface cannot be determined to an accuracy that is sufficient for various applications.

A need therefore exists to provide a method of controlling a mobile manipulator for tracking/following a surface with sufficient accuracy for various applications. It is against this background that the present invention has been developed.

SUMMARY

According to a first aspect of the present invention, there is provided a method of controlling a mobile manipulator for tracking a surface, the mobile manipulator comprising a mobile base movable in an axial direction of the mobile manipulator and a manipulator supported on the mobile base having an end effector adjustable in a lateral direction of the mobile manipulator, the method comprising:
  detecting the surface from the mobile manipulator, including positions of the surface at points along the surface;
  determining a reference path for the end effector to track based on an offset from the surface detected;
  determining a tracking error in the reference path determined; and
  adjusting a position of the end effector in the lateral direction based on the tracking error to compensate for the tracking error in the reference path determined.

In various embodiments, said detecting the surface comprises determining the positions of the surface at points along the surface with respect to the mobile manipulator in a coordinate system of the mobile manipulator.

In various embodiments, said determining the positions of the surface at points along the surface comprises:
  obtaining point cloud data of the surface in the coordinate system of the mobile manipulator; and
  detecting a line from the point cloud data corresponding to the surface, wherein the line indicates the positions of the surface at points along the surface.

In various embodiments, said detecting a line from the point cloud data comprises detecting the line based on a Hough Transform technique.

In various embodiments, the offset is a predetermined distance.

In various embodiments, the tracking error comprises a distance error, and said determining a tracking error comprises determining the distance error based on the surface detected and a position of the mobile manipulator obtained.

In various embodiments, said determining the distance error comprises determining a distance between the surface detected and the position of the mobile manipulator obtained and applying a filter technique based on said distance and a noise factor to obtain the distance error, wherein the noise factor represents a measurement noise in detecting the surface from the mobile manipulator.

In various embodiments, the filter technique is based on a Kalman filter.

In various embodiments, said detecting the surface further comprises detecting orientations of the surface at points along the surface, and wherein the tracking error further comprises an orientation error, and said determining a tracking error further comprises determining the orientation error based on the surface detected and an orientation of the mobile manipulator obtained.

In various embodiments, the method further comprises:
  controlling the mobile base to track the reference path; and
  adjusting an orientation of the mobile base based on the orientation error determined.

In various embodiments, said adjusting an orientation of the mobile base comprises controlling a sensitivity of said adjusting based on the distance error.

In various embodiments, the end effector is further adjustable along a vertical axis or a vertical plane of the mobile manipulator, the vertical axis or the vertical plane being substantially perpendicular to the lateral direction.

According to a second aspect of the present invention, there is provided a mobile manipulator for tracking a surface, the mobile manipulator comprising:
  a mobile base movable in an axial direction of the mobile manipulator;

a manipulator supported on the mobile base having an end effector adjustable in a lateral direction of the mobile manipulator; and a controller configured for controlling the mobile base and the manipulator, the controller comprising:

a surface detection module configured to detect the surface from the mobile manipulator, including positions of the surface at points along the surface;

a reference path determining module configured to determine a reference path for the end effector to track based on an offset from the surface detected;

a tracking error determining module configured to determine a tracking error in the reference path determined; and an adjustment module configured to adjust a position of the end effector in the lateral direction based on the tracking error to compensate for the tracking error in the reference path determined.

In various embodiments, the surface detection module is configured to determine the positions of the surface at points along the surface with respect to the mobile manipulator in a coordinate system of the mobile manipulator.

In various embodiments, the surface detection module is configured to:

obtain point cloud data of the surface in the coordinate system of the mobile manipulator; and detect a line from the point cloud data corresponding to the surface, wherein the line indicates the positions of the surface at points along the surface.

In various embodiments, the tracking error comprises a distance error, and the tracking error determining module is configured to determine the distance error based on the surface detected and a position of the mobile manipulator obtained.

In various embodiments, the tracking error determining module is configured to determine a distance between the surface detected and the position of the mobile manipulator obtained and apply a filter technique based on said distance and a noise factor to obtain the distance error, wherein the noise factor represents a measurement noise in detecting the surface from the mobile manipulator.

In various embodiments, the surface detection module is further configured to detect orientations of the surface at points along the surface, and wherein the tracking error further comprises an orientation error, and the tracking error determining module is further configured to determine the orientation error based on the surface detected and an orientation of the mobile manipulator obtained.

In various embodiments, the controller further comprises a movement module configured to control the mobile base to track the reference path, and the adjustment module is further configured to adjust an orientation of the mobile base based on the orientation error determined.

According to a third aspect of the present invention, there is provided a computer program product, embodied in one or more computer-readable storage mediums, comprising instructions executable by one or more computer processors to perform a method of controlling a mobile manipulator for tracking a surface, the mobile manipulator comprising a mobile base movable in an axial direction of the mobile manipulator and a manipulator supported on the mobile base having an end effector adjustable in a lateral direction of the mobile manipulator, the method comprising:

detecting the surface from the mobile manipulator, including positions of the surface at points along the surface;

determining a reference path for the end effector to track based on an offset from the surface detected;

determining a tracking error in the reference path determined; and adjusting a position of the end effector in the lateral direction based on the tracking error to compensate for the tracking error in the reference path determined.

BRIEF DESCRIPTION OF THE DRAWINGS

Embodiments of the present invention will be better understood and readily apparent to one of ordinary skill in the art from the following written description, by way of example only, and in conjunction with the drawings, in which.

DETAILED DESCRIPTION

As discussed in the background of the present specification, various applications may require a surface to be tracked/followed for performing various functions. By way of examples only and without limitations, example applications include large structure inspection (e.g., welding and welding seam inspection), store checking (e.g., book scanning in a library or item scanning in a grocery store), painting in shipyards, servicing applications (e.g. table and window cleaning), and industrial applications (e.g., cutting and polishing). As can be appreciated, various applications require an end-effector to maintain a consistent close distance to or contact with various surfaces. Therefore, any large error in tracking the surface may have undesirable consequences, such as work being completed by the mobile manipulator in an unsatisfactory manner and/or surfaces being damaged by the mobile manipulator.

Accordingly, various embodiments of present invention provide a method of controlling a mobile manipulator (or mobile manipulator system) for tracking/following a surface with enhanced surface tracking accuracy and for example, seeks to maintain a consistent distance or offset (as desired or predetermined) to the surface for performing various functions/operations as may be required. Various embodiments of the present invention also provide a mobile manipulator for tracking/following a surface.

Figure 1:
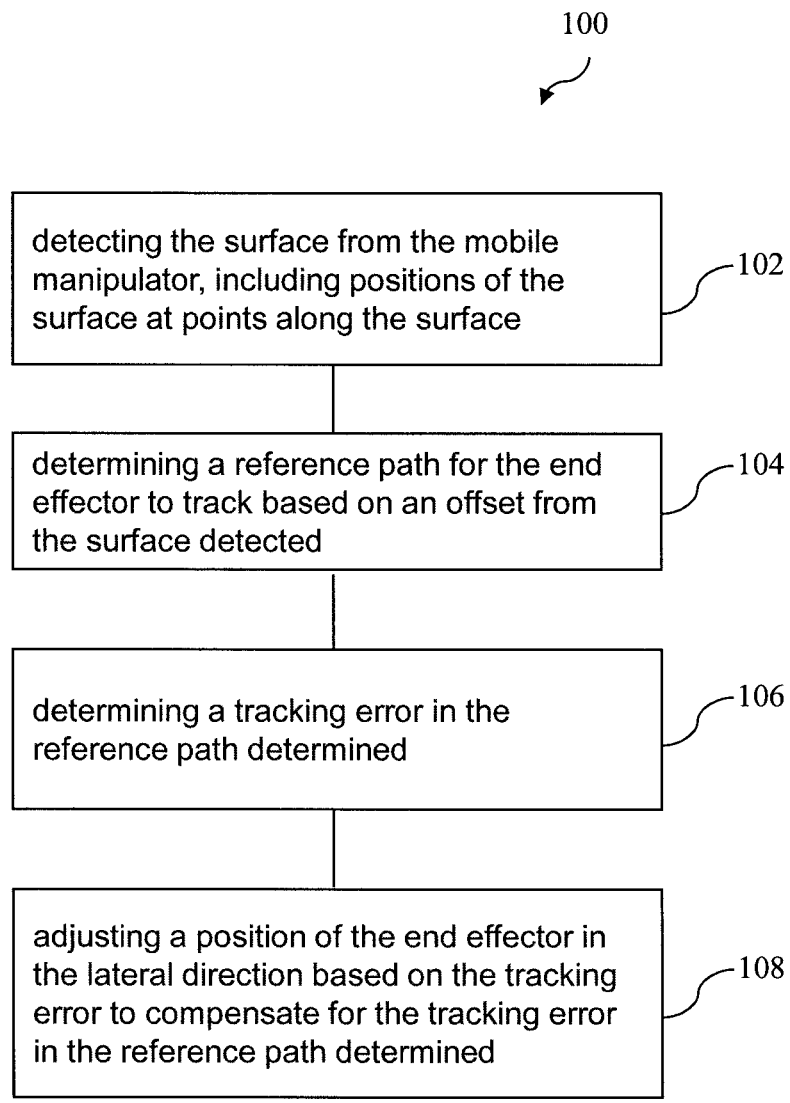
FIG. 1 depicts a schematic flow diagram of a method of controlling a mobile manipulator for tracking a surface according to various embodiments of the present invention.

FIG. 1 depicts a schematic flow diagram of a method 100 of controlling a mobile manipulator for tracking a surface according to various embodiments of the present invention. As will be described later with reference to drawings, the mobile manipulator comprises a mobile base movable in an axial direction of the mobile manipulator and a manipulator supported on the mobile base having an end effector adjustable in a lateral direction of the mobile manipulator. The method 100 comprises a step 102 of detecting the surface from the mobile manipulator, including positions of the surface at points along the surface, a step 104 of determining a reference path for the end effector to track based on an offset from the surface detected, a step 106 of determining a tracking error in the reference path determined, and a step 108 of adjusting a position of the end effector in the lateral direction based on the tracking error to compensate for the tracking error in the reference path determined.

In various embodiments, the tracking error comprises a distance error, and determining the tracking error comprises determining the distance error based on the surface detected and a position of the mobile manipulator obtained (e.g., by proximity sensors, such as laser, radar and LIDAR).

In various embodiments, detecting the surface further comprises detecting orientations of the surface at points along the surface, and whereby the tracking error further comprises an orientation error, and determining the tracking error further comprises determining the orientation error based on the surface detected and an orientation of the mobile manipulator obtained.

Figure 2:
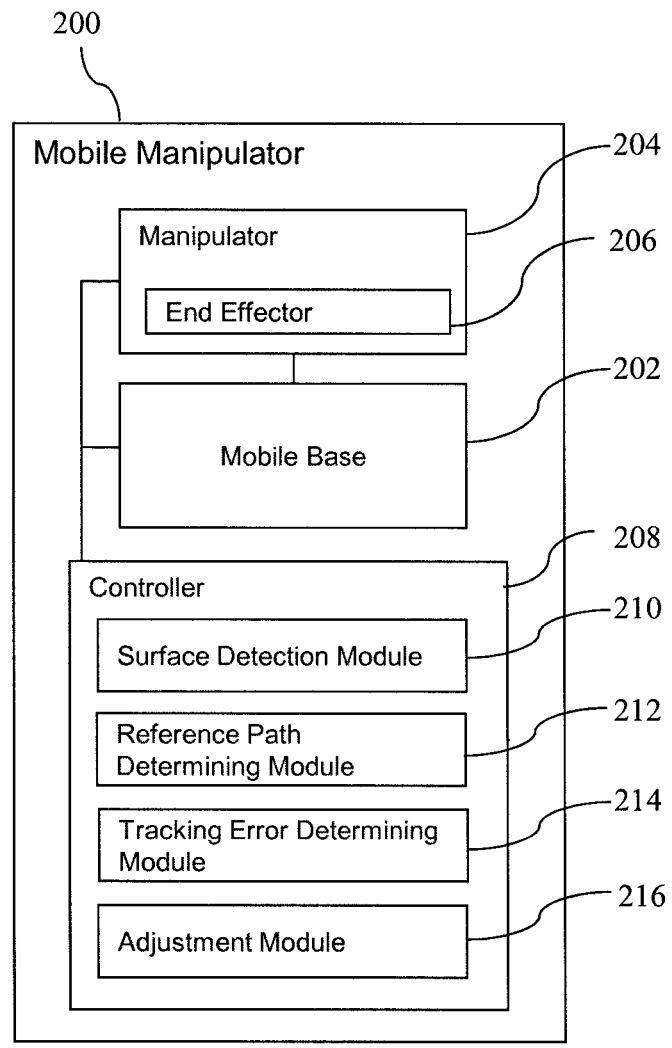
FIG. 2 depicts a schematic drawing of a mobile manipulator (or mobile manipulator system) for tracking a surface (corresponding to the method of FIG. 1) according to various embodiments of the present invention.

FIG. 2 depicts a schematic drawing of a mobile manipulator (or mobile manipulator system) 200 for tracking a surface (corresponding to the above-described method 100) according to various embodiments of the present invention. The mobile manipulator 200 comprises a mobile base 202 movable in an axial direction of the mobile manipulator, a manipulator 204 supported on the mobile base 202 having an end effector 206 adjustable in a lateral direction of the mobile manipulator 200, and a controller 208 configured for controlling the mobile base 202 and the manipulator 204. The controller 208 comprises a surface detection module 210 configured to detect the surface from the mobile manipulator 200, including positions of the surface at points along the surface, a reference path determining module 212 configured to determine a reference path for the end effector to track based on an offset from the surface detected, a tracking error determining module 214 configured to determine a tracking error in the reference path determined, and an adjustment module 216 configured to adjust a position of the end effector in the lateral direction based on the tracking error to compensate for the tracking error in the reference path determined.

It will be appreciated that the above-mentioned modules of the controller 208 may be implemented or located/stored in the controller 208 (as part of the mobile manipulator 200) or may be implemented or located/stored at a remote device or system that can be communicatively coupled to the mobile manipulator during operation. That is, the processing may be carried out remotely but in communication with the controller 208 of the mobile manipulator 200. Furthermore, it will be appreciated that the controller 208 may be realized by one device having the above-mentioned modules or separate devices collectively having the above-mentioned modules located at various parts of the mobile manipulator 200 (e.g., a controller may be provided at the mobile base 202 for controlling the movement of the mobile base 202 and a controller may be provided at the manipulator 204 for controlling the movement/adjustment of the manipulator 204.

In various embodiments, the mobile base 202 may be a macro manipulator movable in its axial direction (i.e., forward and backward including turning/orientating such as in the same or similar manner as a vehicle (e.g., a car)). It will be appreciated that the mobile base 202 movable in its axial direction means that it is at least movable in its axial direction and is not limited to being movable only in such a direction. For example, the mobile base may be rotatable/orientatable about its vertical axis without necessarily moving in its axial direction. In various embodiments, the manipulator 204 may be a mini/micro manipulator such as a robot arm.

Accordingly, the method 100 and the mobile manipulator 200 advantageously take into account the tracking error in the reference path determined for the end effector 206 to track, and furthermore, adjusts the position of the end effector 206 in the lateral direction (i.e., towards or away from the surface, while the mobile base is movable in the axial direction) in order to quickly compensate for the tracking error determined in the reference path. This quickness or fast response in compensating the tracking error enables the mobile manipulator 200 (in particular, the end effector 206) to maintain a sufficiently consistent distance or offset (as desired or predetermined) to the surface for performing various functions/operations as may be required.

A computing system or a controller or a microcontroller or any other system providing a processing capability can be presented according to various embodiments in the present disclosure. Such a system can be taken to include a processor. For example, the controller 208 of the mobile manipulator 200 described herein may include a processor and a memory (e.g., storing the surface detection module 210, the reference path determining module 212, the tracking error determining module 214, and/or the adjustment module 216) which are for example used in various processing carried out in the controller as described herein. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" may be a portion of a system according to various embodiments in the present invention and may encompass a "circuit" as above, or may be understood to be any kind of a logic-implementing entity therefrom.

Some portions of the present disclosure are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus (e.g., the controller 208) for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate.

In addition, the present specification also implicitly discloses a computer program or software/functional module, in that it would be apparent to the person skilled in the art that the individual steps of the methods described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention. It will be appreciated to a person skilled in the art that various modules described herein (e.g., the surface detection module 210, the reference path determining module 212, the tracking error determining module 214, and/or the adjustment module 216) may be software module(s) realized by computer program(s) or set(s) of instructions executable by a computer processor to perform the required functions, or may be hardware module(s) being functional hardware unit(s) designed to perform the required functions. It will also be appreciated that a combination of hardware and software modules may be implemented.

Furthermore, one or more of the steps of the computer program or method may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer program when loaded and executed on such a general-purpose computer effectively results in an apparatus that implements the steps of the methods described herein.

In various embodiments, there is provided a computer program product, embodied in one or more computer-readable storage mediums, comprising instructions (e.g., the surface detection module 210, the reference path determining module 212, the tracking error determining module 214, and/or the adjustment module 216) executable by one or more computer processors to perform a method of controlling a mobile manipulator 200 for tracking a surface as described herein according to various embodiments of the present invention.

The software or functional modules described herein may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

It will be appreciated to a person skilled in the art that the terminology used herein is for the purpose of describing various embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In order that the present invention may be readily understood and put into practical effect, various example embodiments of the present inventions will be described hereinafter by way of examples only and not limitations. It will be appreciated by a person skilled in the art that the present invention may, however, be embodied in various different forms and should not be construed as limited to the example embodiments set forth hereinafter. Rather, these example embodiments are provided so that this disclosure will be thorough and complete, and will fully convey the scope of the present invention to those skilled in the art.

Figure 3:
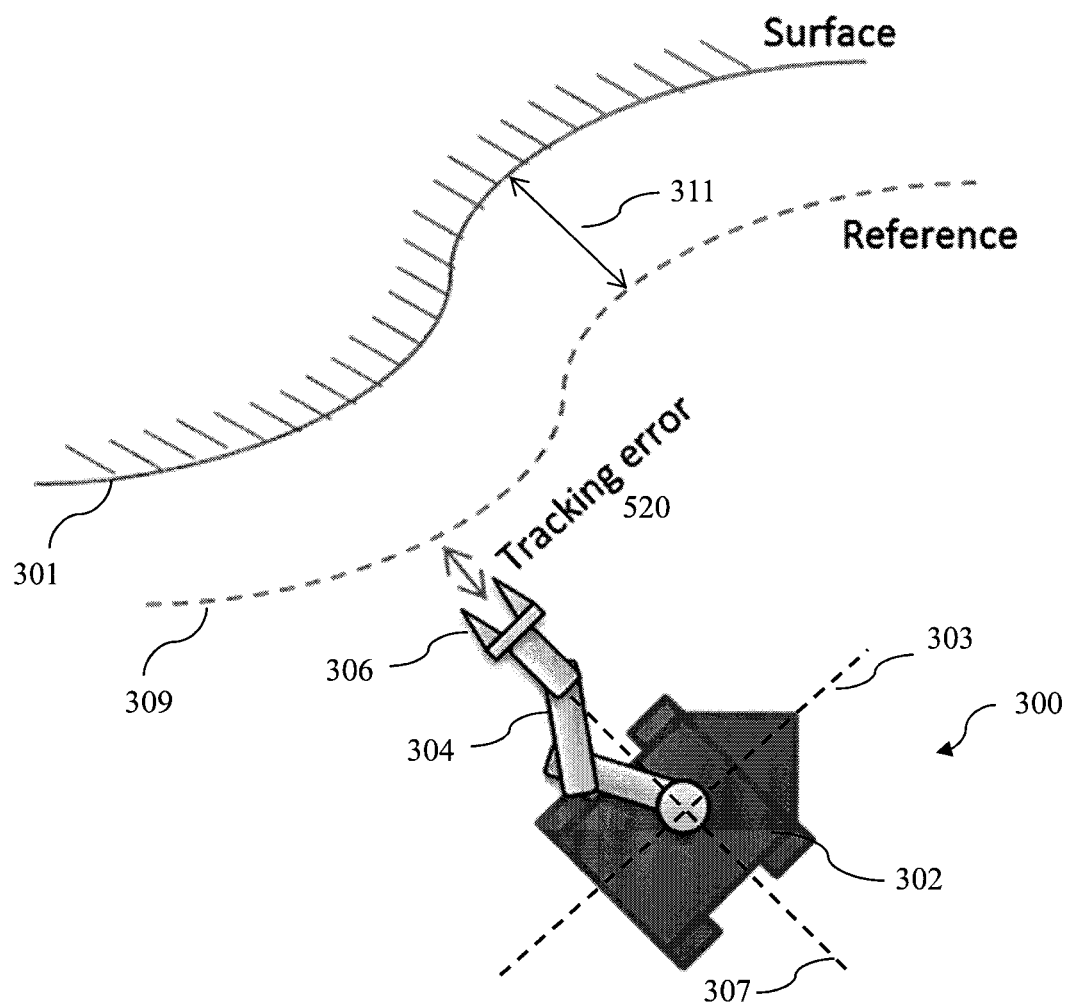
FIG. 3 depicts a schematic drawing illustrating a mobile manipulator for tracking/following a surface according to various example embodiments of the present invention.

FIG. 3 depicts a schematic drawing illustrating a mobile manipulator 300 for tracking/following a surface 301 according to various example embodiments of the present invention. In the example embodiment of FIG. 3, the mobile manipulator 300 may be referred to as a macro-mini (or macro-micro) manipulator system. As shown, the mobile manipulator 300 comprises a mobile base 302 (macro manipulator) movable in an axial direction 303 of the mobile manipulator 300, a manipulator 304 (mini manipulator which is a robot arm in the example embodiment of FIG. 3) supported on the mobile base 302 having an end effector 306 adjustable in a lateral direction 307 of the mobile manipulator 300. The controller 208 configured for controlling the mobile base 302 and the manipulator 304 may be in the mobile manipulator 300. As described hereinbefore, the controller 200 (not shown in FIG. 3) comprises a surface detection module (not shown in FIG. 3) 210 configured to detect the surface 301 from the mobile manipulator 300, including positions of the surface at points along the surface 301, a reference path determining module (not shown in FIG. 3) 212 configured to determine a reference path 309 for the end effector 306 to track based on an offset 311 from the surface 301 detected, a tracking error determining module (not shown in FIG. 3) 214 configured to determine a tracking error in the reference path determined, and an adjustment module (not shown in FIG. 3) 216 configured to adjust a position of the end effector 306 in the lateral direction 307 based on the tracking error to compensate for the tracking error in the reference path 309 determined.

Accordingly, a mobile manipulator 300 having real-time surface tracking capability with sufficient accuracy is provided. In various example embodiments, detecting the surface 301 comprises determining the positions of the surface at points along the surface 301 with respect to the mobile manipulator 300 in a coordinate system of the mobile manipulator 300. In various example embodiments, determining the positions of the surface 301 at points along the surface 301 comprises obtaining point cloud data of the surface 301 in the coordinate system of the mobile manipulator 300, and detecting a line from the point cloud data corresponding to the surface 301, whereby the line indicates the positions of the surface 301 at points along the surface 301. In various example embodiments, detecting the line is performed based on a Hough Transform technique.

As an example, a filtered Hough Transform method is employed to detect the location (or position) and orientation of a surface 301 in the mobile manipulator coordinate system. In Hough Transform, point cloud data from the laser sensors (not shown) on the mobile manipulator 300 is used for line detection (line corresponding to the surface 301). A reference line/path 309 is then determined based for the end effector 306 to track based on an offset (e.g., corresponding to a predetermined (required or desired) distance between the end effector 306 to the surface 301) from the surface 301. The slope and the distance between the reference line 309 to the mobile manipulator 300 is then calculated for tracking. It will be appreciated that if no straight line is detected, a curvature will be calculated instead.

However the reference line 309 obtained directly based on the laser measurement is usually noisy. To reduce or minimize this noise, a filter is applied according to various example embodiments of the present for reducing the noise level (and thus reducing tracking errors). Through this filter, an estimated reference line based on both the laser measurement (for detecting the surface 301 from the mobile manipulator 300 from which the reference path 309 is determined) and the mobile manipulator location (e.g., obtained using proximity sensors, such as laser, radar and LIDAR) is calculated for the mobile manipulator 300 to track.

Accordingly, in various example embodiments, determining the tracking error comprises determining a distance and an orientation between the position of the mobile manipulator 300 obtained and the surface 301 detected, and applying a filter technique based on the distance and the orientation determined and a noise factor to obtain the tracking error (including distance error and orientation error). In this regard, the noise factor represents a measurement noise in detecting the surface 301 from the mobile manipulator 300.

For better understanding, an illustrative non-limiting example will now be described according to an example embodiment of the present invention. Assuming at time t=nT, where n is an integer and T is the sampling time, the mobile manipulator 300 is at [x(n), y(n), α(n)] (position and orientation), and the distance and orientation between the mobile manipulator 300 and the reference line 309 are r(n), θ(n), respectively. At t=(n+1)$^T$, the mobile manipulator 300 moves to [x(n+1), y(n+1), α(n+1)] and the distance and orientation changes by Δr and Δθ, which are obtained based on mobile manipulator localization and represented in the mobile manipulator coordinate system as follows:

$$r(n+1) = r(n) + \Delta r$$

$$y_r(n) = r(n)$$

$$\theta(n+1) = \theta(n) + \Delta\theta$$

$$y_\theta(n) = \theta(n)$$

where $$\Delta r = \frac{\sin\beta(x(n+1) - x(n)) + \cos\beta(y(n+1) - y(n))}{\sqrt{\sin\beta\cos\beta}},$$

$$\Delta\theta = -(\alpha(n) - \alpha(n+1)), \text{ and}$$

$$\beta = \alpha(n) + \theta(n).$$

$y_r$ and $y_\theta$ are the systems outputs.

However, due to the noise introduced by the laser sensor, the actual measured distance and orientation will be:

$$r(n+1) = r(n) + \Delta r + m_r$$

$$\theta(n+1) = \theta(n) + \Delta\theta + m_\theta$$

where $m_r$ and $m_\theta$ represents white noise in measuring the distance and orientation, respectively.

By applying Kalman filter, the line estimator is derived as follows:

$$\tilde{r}(n+1|n) = \tilde{r}(n|n-1) + \Delta r(n)$$

$$\tilde{r}(n|n) = \tilde{r}(n|n-1) + M(r(n) - \tilde{r}(n|n-1))$$

where $\tilde{r}(n|n)$ represents the estimated distance at time t=nT, based on the current sensor feedback. $\tilde{r}(n+1|n)$ denotes the estimated distance at t=(n+1)$^T$, based on the current sensor feedback obtained at time t=nT. M is the optimal innovation gain which is obtained by solving the Kalman filter equations (e.g., may be computed offline using various appropriate software such as MATLAB).

Since the environment is usually unstructured, objects around the surface may also contribute to the noise. To ameliorate this, according to various example embodiments of the present invention, only selected part of the sensor reading (point cloud data) will be used for the above-described Hough Transform, which will be described below.

Let $\alpha_{min}$ and $\alpha_{max}$ be the minimum and maximum angle of the point cloud data used for line detection. For example, part/portion of the point cloud data may be selected/filtered based on the following condition:

$$[\alpha_{min}, \alpha_{max}] = \begin{cases} [\frac{\pi}{2}, \pi - \beta], & \text{near starting point} \\ [\beta, \pi - \beta], & \text{away from the point} \\ [\beta, \frac{\pi}{2}], & \text{near the ending pointing} \end{cases}$$

where $\beta > 0$.

Based on the above condition, for example, when the mobile manipulator 300 is near a starting point (e.g., in the case of scanning items on a shelf, the starting point may be at a starting scanning point at a starting end of the shelf), only part $$\left(\frac{\pi}{2} \text{ to } \pi - \beta\right)$$

of the point cloud data maybe be selected for input to the Hough Transform (e.g., since the other part of the point cloud data may merely be unstructured environment (e.g., background information) not relevant to the shelf). However, when away from the starting point, a wider range ($\beta$ to $\pi-\beta$) of the point cloud data may be selected for input to the Hough Transform (e.g., since the mobile manipulator 300 is moving adjacent the shelf being scanned). On the other hand, when near the ending point (e.g., the ending point may be at an ending scanning point at another end of the shelf or another shelf), only part $$\left(\beta \text{ to } \frac{\pi}{2}\right)$$

of the point cloud data may be selected for input to the Hough Transform (e.g., since other part of the point cloud data may be merely be unstructured environment not relevant to the shelf). Therefore, by selecting/filtering various parts of the point cloud data based on expected surrounding environment at various stages in the tracking the surface 301, less unstructured environment will contribute to line detection for detecting the surface using the Hough Transform, thereby reducing noise.

In various embodiments, the controller 208 is configured to control the mobile base 302 to track the reference path 309, and also configured to adjust an orientation of the mobile base 302 based on the orientation error determined. In this regard, as mentioned hereinbefore, the reference line 309 obtained directly based on the laser measurement is usually noisy. Therefore, the filter as described hereinbefore is for reducing the noise level (and thus reducing tracking errors), and through such filter, an estimated reference line based on both the laser measurement and the mobile manipulator location is calculated for the mobile manipulator 300 to track. The controller 208 will now be described further according to various example embodiments of the present invention.

In an example embodiment, the controller 208 configured for controlling mobile manipulator trajectory (mobile robot trajectory following controller) is implemented on a mobile manipulator with differential drive as follows:

$$v = v_{des}$$

$$\omega = \omega_1 + \omega_2$$

where $v$ and $\omega$ are the linear and angular velocity command, respectively. Let $r_e$ and $\theta_e$ denote the distance error and orientation error, respectively. Let $v_{des}$ denote the desired linear speed. Then, the control effort contributed by the distance error and orientation error may be defined respectively as:

$$\omega_1 = -\frac{k_1 d_e}{v_{des}}$$

$$\omega_2 = -(k_2 + k_3|d_e|)\tan\left(\frac{\theta_e}{k_4}\right)$$

where $k_1$, $k_2$, $k_3$ and $k_4$ are the controller gain. In this controller, $k_1$, $k_2$, and $k_3$ are used to adjust the weight of error compensation on distance and orientation. Since a mobile manipulator may have limited angular velocity, a gain $k_4$ is advantageously introduced according to example embodiments to shape the range of the orientation error. With this gain $k_4$, the controller's sensitive to orientation error can be adjusted. For example, since the orientation error $\theta_e \in [-\pi,\pi]$, $k_4$ may be selected according to example embodiments such that $$\frac{\theta_e}{k_4} \in \left(-\frac{\pi}{2}, \frac{\pi}{2}\right)$$

in order to ensure tan $$\left(\frac{\theta_e}{k_4}\right)$$

does not cross ±∞. Therefore, as $k_4$ increases, the controller 208 will become less sensitive to orientation error, especially when this error is large. Based on the above configuration of the controller, it can be appreciated that the output angular velocity command is formed at a balance between the distance error and the orientation error. When the distance error is large, the balance will be achieved at large orientation error $\theta_e$ so that the robot will approach the reference fast. When the distance error is small, the balance will be achieved at small orientation error. In this manner, the robot trajectory will converge to the reference efficiently. Accordingly, in various example embodiments, adjusting an orientation of the mobile base 302 comprises controlling a sensitivity of such an adjustment based on the distance error. This is to ensure fast convergence in the tracking error.

In various example embodiments, the manipulator 304 may be a robot arm as illustrated in FIG. 3. The robot arm design and control according to the various example embodiments will now be described.

Theoretically, the mobile robot trajectory following controller described above will enable the mobile manipulator 300 to track a reference line with no steady state error. However, as a differential wheel mobile manipulator cannot move in its lateral direction, any tracking error induced by disturbances could not be recovered/corrected easily. A macro-mini (or macro-micro) manipulator system generally refers to a system comprising a larger manipulator carrying a smaller manipulator. In a mobile macro-mini manipulator system (e.g., the mobile manipulator 300 as shown in FIG. 3), the mobile base 302 acts as the macro manipulator, which provides large workspace while the robot arm 304 acts as the mini manipulator which provides fast response to tracking error. Therefore, such a coupled system according to embodiments of the present invention advantageously provide both large workspace and fast response speed.

According to various example embodiments of the present invention, in order to quickly respond to any distance error, a robot arm 304 that is able to move/adjust the end-effector 306 in the lateral direction 307 (i.e., towards or away from the surface 301) of the mobile base 302 is configured. In various example embodiments, a robot arm 304 that is additionally able to move/adjust the end-effector 306 in a vertical direction or along a vertical plane (substantially perpendicular to the lateral direction) of the mobile manipulator 300 is configured, e.g., for adjusting the height of the end effector 306. However, for simplicity, only the example of adjusting the end-effector 306 in the lateral direction 307 will be described hereinafter. A person skilled in the art will be able to extend this to also adjust the end-effector 306 in the vertical plane.

Figure 4:
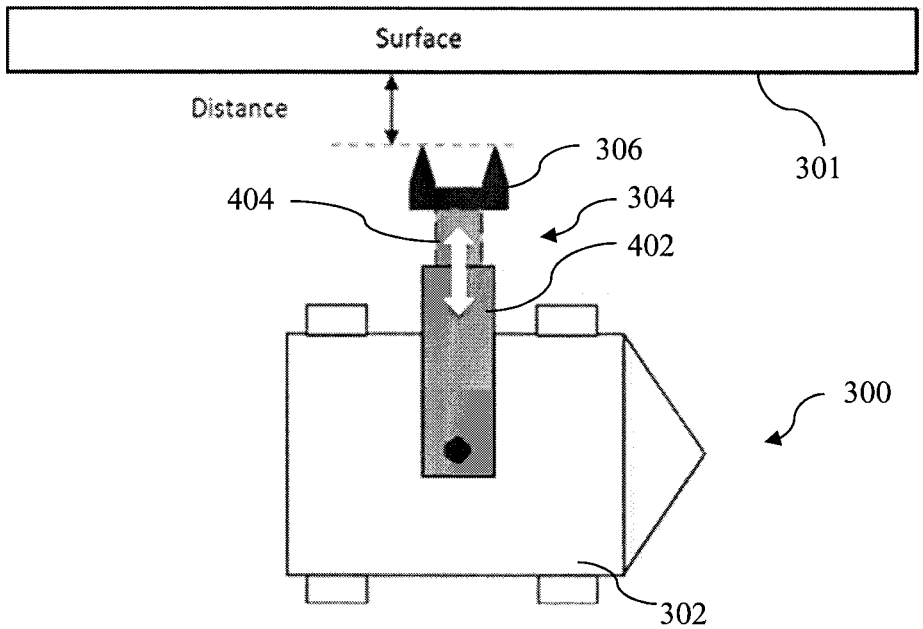
FIG. 4 depicts a schematic drawing of mobile manipulator having a robot arm configured with an extrusion mechanism thereon according to various example embodiments of the present invention.

FIG. 4 illustrates a mobile manipulator 300 having a robot arm 304 configured with an extrusion mechanism 402 thereon according to various example embodiments of the present invention. The extrusion mechanism 402 comprises an ultra-sonic sensor (not shown) to measure the distance to the surface 301 and an actuator 404 configured to move the end-effector 306 in the lateral direction 307. A control algorithm/technique is configured to control the end-effector 306 to move closer or further to the surface 301 based on the ultra-sonic sensor feedback. This may form part of the robot arm control module, which may also be responsible for adjusting the height of the end-effector 306.

Figure 5:
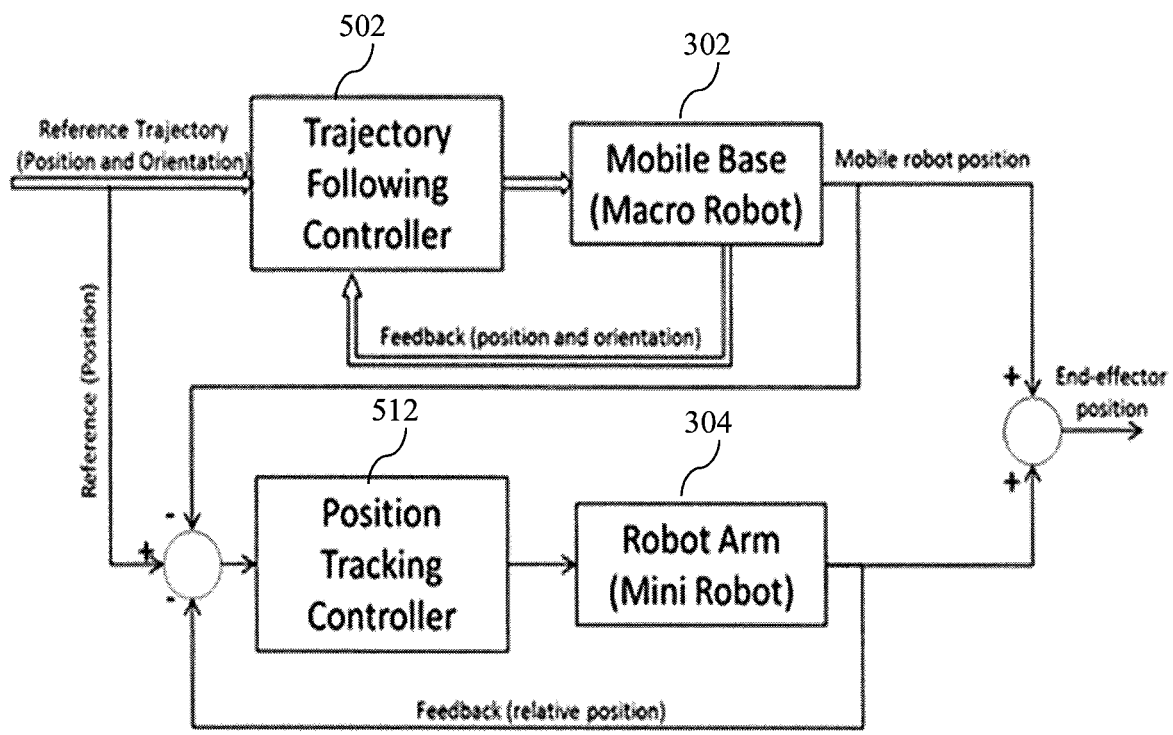
FIG. 5 depicts a schematic flow diagram illustrating a controller architecture of the mobile manipulator according to various example embodiments of the present invention.

FIG. 5 depicts a schematic flow diagram illustrating the controller architecture of the mobile manipulator 300 according to various example embodiments of the present invention. As shown, the controller 208 may comprise a trajectory following controller 502 configured to control the mobile base 302 to track the reference path 309, and a position tracking controller 512 configured to control the robot arm 304. The trajectory following controller 502 controls the movement of the mobile base 302 based on the current reference trajectory (including position and orientation) determined and the current position and orientation of the mobile base 302 obtained (fed back from the mobile base 302). The position tracking controller 512 controls the movement of the robot arm 304 based on the position in the current reference trajectory determined and the current relative position of the robot arm 304 (i.e., position relative to the mobile base 302). It can be seen from FIG. 5 that the tracking error is fed back to the robot arm 304 as an input. Therefore, the position error of the end-effector 306 on the robot arm 304 can be compensated for enhancing tracking accuracy.

Figure 6:
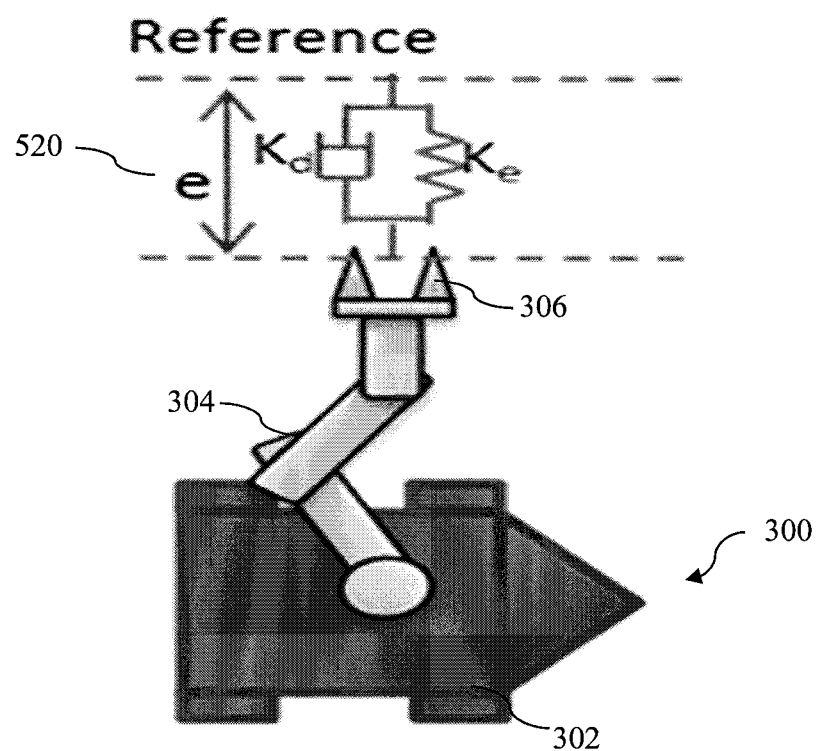
FIG. 6 illustrates a virtual force modelled (virtual spring-damper) for the tracking error between the end-effector and the reference line according to various example embodiments of the present invention.

Referring back to FIG. 3, let the end-effector tracking error (e) 520 be the distance from the end-effector 306 to the reference line 309. In FIG. 5, the robot arm controller takes the tracking error (e) as an input. In various example embodiments, a Proportional-Derivative (PD) controller is applied for smooth and fast tracking.

$$F=K_d \dot{e}+K_p e$$

where F represents the virtual force between the end-effector 306 and the reference line 309. Thus, between the end-effector 306 and the reference line 309, a virtual spring-damper is created as modelled in FIG. 6. Therefore, this demonstrates that when there is a position error in the end-effector 306, a virtual force will be generated to reduce the position error according to various embodiments of the present invention.

Therefore, according to various embodiments of the present invention, a mobile base (macro manipulator) 302 provides the trajectory generating method with sensor fusion for high accuracy tracking of mobile robots. Such a mobile base 302 may have a slower response with possibly separate sensing mechanism that has longer range but lower precision. The manipulator (mini manipulator) 304 is configured to be able to adjust the end-effector 306 in a lateral direction of the mobile manipulator 300 so as to compensate position error of the end-effector 306. Such a mini manipulator has faster response, with higher precision but short range. Therefore, the combination of macro-mini manipulation mechanism/system as described hereinbefore advantageously generates a system with accurate and fast trajectory tracking capability.

Figure 7A:
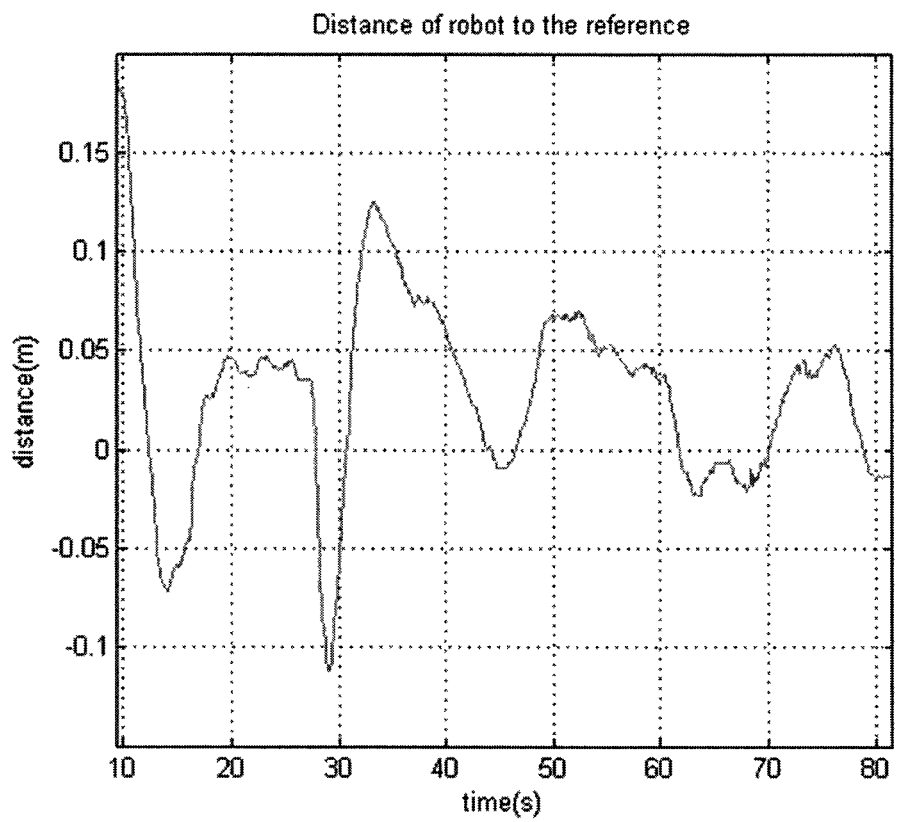
FIG. 7A depicts a plot showing the reference tracking performance of a mobile manipulator having the surface tracking capability but without the end effector lateral adjustment capability according to an example embodiment of the present invention.
Figure 7B:
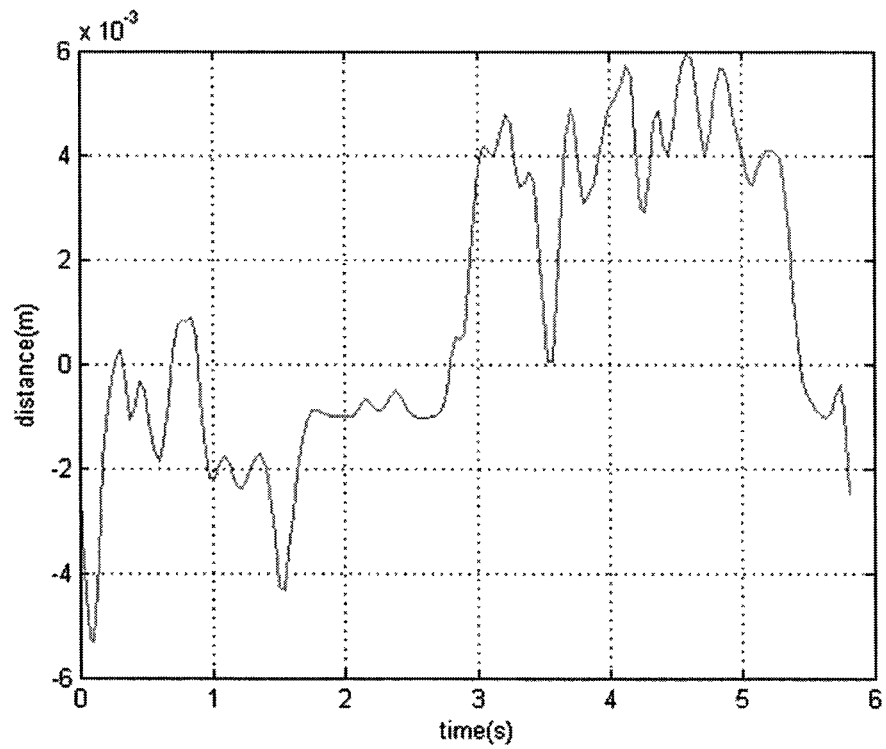
FIG. 7B depicts a plot showing the reference tracking performance of the mobile manipulator which integrates the surface tracking capability with the end effector lateral adjustment capability according to an example embodiment of the present invention.

In an experiment conducted according to an example embodiment of present invention, FIG. 7A depicts a plot showing the reference tracking performance of a mobile manipulator having the surface tracking capability but without the end effector lateral adjustment capability as described hereinbefore, and FIG. 7B depicts a plot showing the reference tracking performance of the mobile manipulator 300 which integrates the surface tracking capability with the end effector lateral adjustment capability. In the experiment, the controller gains $k_1$, $k_2$, $k_3$ and $k_4$ are set to be 0.44, 0.2, 4.0, and 4.0, respectively. In the experiment, for the mobile manipulator 300, a low-pass filter was applied to the ultra-sonic sensors feedback and the results were measured using an external laser sensor fixed on the surface. From FIG. 7A, it can be observed that the mobile manipulator approached the reference from 0.2 m away and converged to the reference and settled down to a margin within ±0.02 m, with standard deviation of 0.0864 m. From FIG. 7B, it can be seen that the end effector tracking error has been significantly reduced to within ±0.006 m, with standard deviation of 0.0029 m. Several experiments were conducted, and they exhibit similar and consistent result. Therefore, the experiments conducted demonstrate the effectiveness in the mobile manipulator 300 to correct tracking errors and furthermore, is able to consistently provide an enhanced surface tracking performance.

While embodiments of the present invention have been particularly shown and described with reference to specific embodiments, it should be understood by those skilled in the art that various changes in form and detail may be made therein without departing from the scope of the present invention as defined by the appended claims. The scope of the present invention is thus indicated by the appended claims and all changes which come within the meaning and range of equivalency of the claims are therefore intended to be embraced.

What is claimed is:

1. A method of controlling a mobile manipulator for tracking a surface, the mobile manipulator comprising a mobile base movable in an axial direction of the mobile manipulator and a manipulator supported on the mobile base having an end effector adjustable in a lateral direction of the mobile manipulator, the method comprising:
   detecting the surface from the mobile manipulator, including positions of the surface at points along the surface;
   determining a reference path for the end effector to track based on an offset from the surface detected;
   determining a tracking error between the reference path determined and the mobile manipulator; and
   adjusting a position of the end effector in the lateral direction based on the tracking error to compensate for the tracking error in the reference path determined.

2. The method according to claim 1, wherein said detecting the surface comprises determining the positions of the surface at points along the surface with respect to the mobile manipulator in a coordinate system of the mobile manipulator.

3. The method according to claim 2, wherein said determining the positions of the surface at points along the surface comprises:

obtaining point cloud data of the surface in the coordinate system of the mobile manipulator; and detecting a line from the point cloud data corresponding to the surface, wherein the line indicates the positions of the surface at points along the surface.

4. The method according to claim 3, wherein said detecting a line from the point cloud data comprises detecting the line based on a Hough Transform technique.

5. The method according to claim 1, wherein the offset is a predetermined distance.

6. The method according to claim 1, wherein the tracking error comprises a distance error, and said determining a tracking error comprises determining the distance error based on the snake detected and a position of the mobile manipulator obtained.

7. The method according to claim 6, wherein said determining the distance error comprises determining a distance between the surface detected and the position of the mobile manipulator obtained and applying a filter technique based on said distance and a noise factor to obtain the distance error, wherein the noise factor represents a measurement noise in detecting the surface from the mobile manipulator.

8. The method according to claim 7, wherein the filter technique is based on a Kalman filter.

9. The method according to claim 6, wherein said detecting the surface further comprises detecting orientations of the surface at points along the surface, and wherein the tracking error further comprises an orientation error, and said determining a tracking error further comprises determining the orientation error based on the surface detected and an orientation of the mobile manipulator obtained.

10. The method according to claim 9, further comprises:

controlling the mobile base to track the reference path; and adjusting an orientation of the mobile base based on the orientation error determined.

11. The method according to claim 10, wherein said adjusting an orientation of the mobile base comprises controlling a sensitivity of said adjusting based on the distance error.

12. The method according to claim 1, wherein the end effector is further adjustable along a vertical axis or a vertical plane of the mobile manipulator, the vertical axis or the vertical plane being substantially perpendicular to the lateral direction.

13. A mobile manipulator for tracking a surface, the mobile manipulator comprising:

a mobile base movable in an axial direction of the mobile manipulator;

a manipulator supported on the mobile base having an end effector adjustable in a lateral direction of the mobile manipulator; and a controller configured for controlling the mobile base and the manipulator, the controller comprising at least one processor to:

detect the surface from the mobile manipulator, including positions of the surface at points along the surface;

determine a reference path for the end effector to track based on an offset from the surface detected;

determine a tracking error between the reference path determined and the mobile manipulator; and adjust a position of the end effector in the lateral direction based on the tracking error to compensate for the tracking error in the reference path determined.

14. The mobile manipulator according to claim 13, wherein to detect the surface from the mobile manipulator the at least one processor is further to determine the positions of the surface at points along the surface with respect to the mobile manipulator in a coordinate system of the mobile manipulator.

15. The mobile manipulator according to claim 14, wherein to detect the surface from the mobile manipulator at least one processor is further to:

obtain point cloud data of the surface in the coordinate system of the mobile manipulator; and detect a line from the point cloud data of the surface, wherein the line indicates the positions of the surface at points along the surface.

16. The mobile manipulator according to claim 13, wherein the tracking error comprises a distance error, and wherein to determine the tracking error in the reference path determined the at least one processor is further to determine the distance error based on the surface detected and a position of the mobile manipulator obtained.

17. The mobile manipulator according to claim 16, wherein to determine the distance error the at least one processor is further to determine a distance between the surface detected and the position of the mobile manipulator obtained and apply a filter technique based on said distance and a noise factor to obtain the distance error, wherein the noise factor represents a measurement noise in detecting the surface from the mobile manipulator.

18. The mobile manipulator according to claim 16, wherein to detect the surface from the mobile manipulator the at least one processor is further to detect orientations of the surface at points along the surface, and wherein the tracking error further comprises an orientation error, and the tracking error determining module is further configured to determine the orientation error based on the surface detected and an orientation of the mobile manipulator obtained.

19. The mobile manipulator according to claim 18, wherein the the at least one processor is further to control the mobile base to track the reference path, and wherein to adjust a position of the end effector in the lateral direction the at least one processor is further to adjust an orientation of the mobile base based on the orientation error determined.

20. A non-transitory computer-readable storage medium storing thereon a computer program product comprising instructions executable by one or more computer processors to perform a method of controlling a mobile manipulator for tracking a surface, the mobile manipulator comprising a mobile base movable in an axial direction of the mobile manipulator and a manipulator supported on the mobile base having an end effector adjustable in a lateral direction of the mobile manipulator, the method comprising:

detecting the surface from the mobile manipulator, including positions of the surface at points along the surface;

determining a reference path for the end effector to track based on an offset from the surface detected;

determining a tracking error between the reference path determined and the mobile manipulator; and adjusting a position of the end effector in the lateral direction based on the tracking error to compensate for the tracking error in the reference path determined.

* * * * *